(12) United States Patent
Forster

(10) Patent No.: US 10,026,035 B2
(45) Date of Patent: Jul. 17, 2018

(54) RFID TAG INCLUDING A COATING

(75) Inventor: Ian J. Forster, Essex (GB)

(73) Assignee: AVERY DENNISON RETAIL INFORMATION SERVICES, LLC, Mentor, OH (US)

( * ) Notice: Subject to any disclaimer, the term of this patent is extended or adjusted under 35 U.S.C. 154(b) by 294 days.

(21) Appl. No.: 13/070,818

(22) Filed: Mar. 24, 2011

(65) Prior Publication Data
US 2012/0242318 A1    Sep. 27, 2012

(51) Int. Cl.
*G08B 23/00* (2006.01)
*G06K 19/077* (2006.01)

(52) U.S. Cl.
CPC ... *G06K 19/07749* (2013.01); *Y10T 29/49018* (2015.01)

(58) Field of Classification Search
None
See application file for complete search history.

(56) References Cited

U.S. PATENT DOCUMENTS

| | | | |
|---|---|---|---|
| 2007/0195143 A1* | 8/2007 | Andrews | 347/93 |
| 2009/0009332 A1* | 1/2009 | Nunez et al. | 340/572.1 |
| 2009/0027204 A1* | 1/2009 | Fujimaki | G06K 19/07749 |
| | | | 340/572.1 |
| 2009/0184824 A1 | 7/2009 | Forster | |
| 2009/0224883 A1* | 9/2009 | Angell et al. | 340/10.1 |
| 2010/0038763 A1* | 2/2010 | Wang | 257/679 |
| 2010/0123553 A1* | 5/2010 | Banerjee et al. | 340/10.1 |
| 2012/0050011 A1* | 3/2012 | Forster | 340/10.1 |
| 2012/0313757 A1* | 12/2012 | Volpi | G06K 7/0008 |
| | | | 340/10.1 |

FOREIGN PATENT DOCUMENTS

EP    2264651    12/2010

OTHER PUBLICATIONS

International Search Report dated Jul. 17, 2012 for International Application No. PCT/US2012/028397 filed Mar. 9, 2012.
Written Opinion dated Jul. 17, 2012 for International Application No. PCT/US2012/028397 filed Mar. 9, 2012.

* cited by examiner

*Primary Examiner* — Thomas McCormack
(74) *Attorney, Agent, or Firm* — Avery Dennison Retail Information Services, LLC

(57) ABSTRACT

A RFID device which can include a substrate, an antenna having a gap defined therein, a wireless communications device coupled to the antenna and a coating disposed over a portion of the antenna and within a portion of the gap. The coating may be an insulator or an environmentally-responsive material.

4 Claims, 1 Drawing Sheet

RFID TAG INCLUDING A COATING

FIELD OF THE INVENTION

The present invention is in the field of RFID tags, and more particularly RFID tags that incorporate a coating to serve as an insulator and/or sensing or triggering coating.

BACKGROUND OF THE INVENTION

The use of radio frequency identification (RFID) to identify one of a plurality of items is well known. Typical RFID tags or integrated circuits include a microprocessor, also known as a microchip, electrically connected to an antenna. Alternatively, the microchip is first attached to a pad having electrical leads that provides a larger attachment of "landing" area. This is typically referred to as a "strap" or "interposer." The strap is then attached to the antenna.

The microprocessor stores data, which can include identifying data unique to a specific item, which is transmitted to an external receiver for reading by an operator and processing of the item. RFID tags can be attached to items for inventory control, shipment control, and the like. RFID tags are particularly useful in identifying, tracking and controlling items such as packages, pallets, and other product containers. The location of each item can be tracked and information identifying the owner of the item or specific handling requirements, can be encoded into the RFID and later read by a scanning device capable of decoding and displaying the information.

Accordingly, RFID tags can be attached to items entering or within a supply chain and the identifying information received can be processed for various reasons in a variety of manners. RFID tags are particularly useful in identifying, tracking and controlling items such as pallets, packages and individual product containers. In many instances, it is desirable to monitor and obtain information regarding the environmental conditions to which the items are exposed. For example, certain items may be sensitive to fluctuations in temperature, humidity, pressure, or other physical parameters, and certain items may be sensitive to the presence or absence of chemical or biological materials. As with many products contained in individual containers within supply chains, obtaining environmental conditions information at the item-level is beneficial within supply chains where the quality, safety, lifespan, or other characteristics of the items may be affected by environmental conditions.

SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

According to one exemplary embodiment, an RFID device is disclosed. The RFID device may include a substrate, an antenna having a gap defined therein, a wireless communications device coupled to the antenna; and a coating disposed over a portion of the antenna and within a portion of the gap. The coating may be an insulator or an environmentally-responsive material.

Yet another exemplary embodiment can describe a method of forming an RFID device. The method of forming an RFID device can include steps for depositing an electrically conductive material on a substrate, defining a gap in the first electrically conductive material, depositing a coating over a portion of the electrically conductive material and within the gap, and coupling a wireless communications device to the antenna structure.

Another exemplary embodiment describes a method of detecting an environmental condition, which can include wirelessly communicating with an RFID device having an antenna structure and varying an operating parameter of the antenna structure in relation to the environmental condition.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE FIGURES

These advantages, as well as other objects and advantages of this invention, will be more completely understood and appreciated by referring to the following more detailed description of the presently preferred exemplary embodiments of the invention in conjunction with the accompanying drawings, of which.

DETAILED DESCRIPTION OF THE INVENTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature, advantage or mode of operation.

Figure 1A:
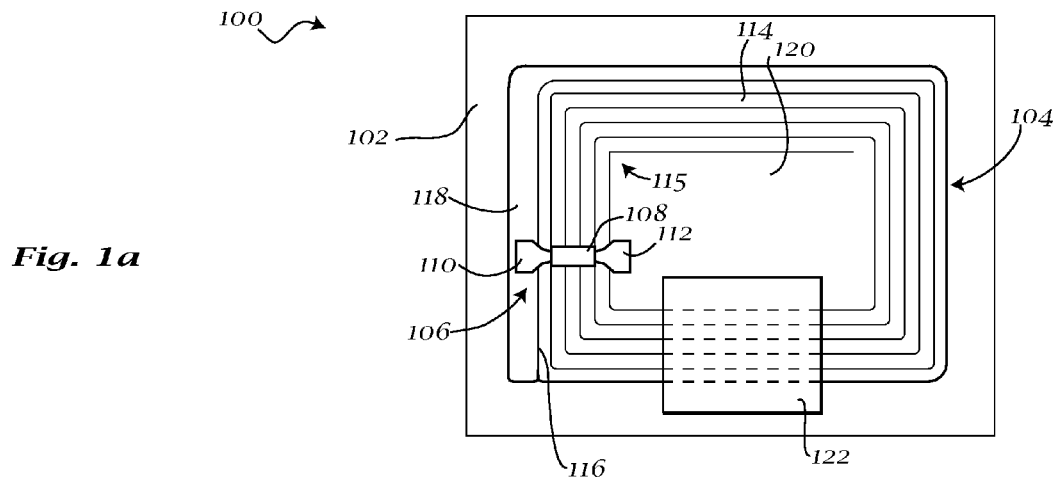
FIG. 1a is a plan view of an exemplary embodiment of an RFID device.
Figure 1B:
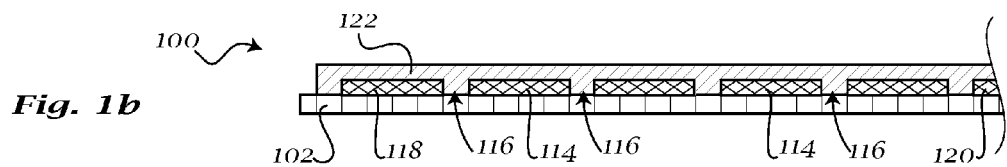
FIG. 1b is a partial cross-section view of an exemplary embodiment of an RFID device.
Figure 1C:
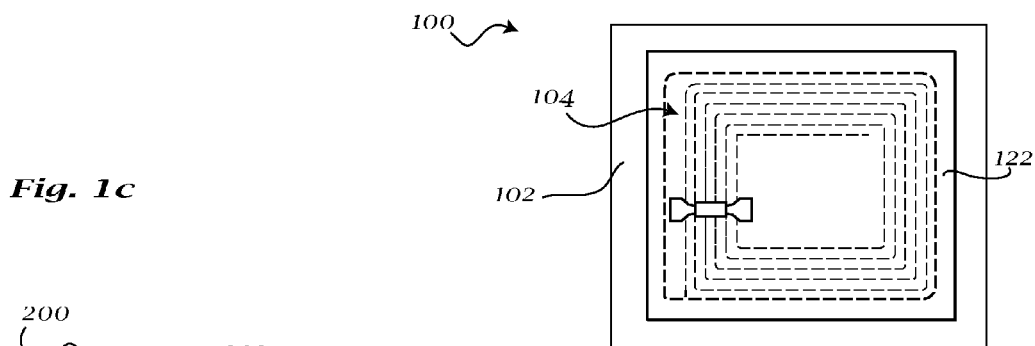
FIG. 1c is a plan view of another exemplary embodiment of an RFID device.
Figure 2:
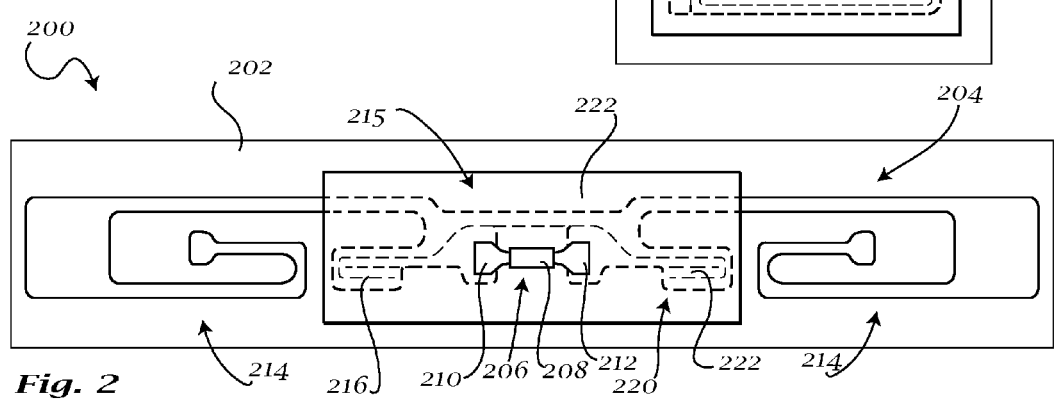
FIG. 2 is a plan view of another exemplary embodiment of an RFID device.

Generally referring to FIGS. 1a-2, an RFID device including an antenna structure and a coating is disclosed. The coating may be configured to be responsive to an ambient environmental condition such as a physical parameter or to the presence or absence of a chemical or biological material. The antenna structure may be locally modified or otherwise enhanced in order to achieve an optimized interaction between the environmentally-sensitive material, and the antenna structure. To that end, the RFID device may also include a secondary conductive element.

Turning to FIGS. 1a-1c, an exemplary embodiment of an RFID device 100 is shown. RFID device 100 can have a variety of components. RFID device 100 may include a substrate 102, and an electrically conductive antenna 104 disposed thereon. Substrate 102 can be any material, for example paper, coated paper, polyethylene terephthalate (PET), laminations of film and paper or any other suitable substrate that can be desired. Antenna 104 can be any of a variety of materials, for example aluminum, copper, silver or another thin, conductive material, for example etched or hot-stamped metal foil. Antenna 104 may be coupled to a wireless communications device, such as an RFID chip 108 that may be part of an RFID strap or interposer 106. Strap or interposer 106 may further include conductive leads 110, 112 to facilitate coupling between antenna 104 and RFID chip 108. In some embodiments, strap or interposer 106 may also include a substrate to facilitate supporting RFID chip 108 and conductive leads 110.

Antenna 104 may be a continuous, unitary layer of conductive material, and may be formed as a coil. Antenna 104 may include a structure including a plurality of loops 114 separated from each other by gap 116, including an outer loop 118 and a central portion 120. It should be appreciated that antenna 104 can have any number of loops, including a single loop, and may have fewer or more loops than the exemplary antenna illustrated in FIGS. 1a-1c. Loops 114 may further have a plurality of rounded or rectangular turns 115. Gap 116 may be a continuous gap having one end at the edge of antenna 104 and between outer loop 118 and the next innermost loop, and having a second end in the interior of the antenna 104 and between central portion 120 and the next innermost loop. Gap 116 may be formed by any desired process that is not likely to remove significant amounts of the material from which antenna 104 is formed, resulting in gap 116 being narrow relative to the width of loops 114. For example, gap 116 may be formed by rotary cutting, laser ablation, etching, other methods of mechanical or chemical material removal, or any other method known in the art. Antenna 104 may be adapted to operate at a particular frequency. For example, antenna 104 may operate in the HF (high-frequency range) at a frequency of 13.56 MHz, or any other desired frequency.

Outer loop 118 and central portion 120 may be coupled to each of conductive leads 110, 112, respectively, of strap or interposer 106. Conductive leads 110, 112 may in turn be coupled to contact points disposed on RFID chip 108. Strap or interposer 106 may further be disposed over loops 114 of antenna 104 such that it bridges loops 114 and facilitates coupling between portions 118, 120 via strap or interposer 106. Coupling between antenna 104 and strap or interposer 106 may be a direct, conductive coupling or may be an indirect, reactive coupling, such as, for example, capacitive or inductive coupling.

RFID device 100 may further include a coating 122. In some embodiments, coating 122 responsive materials may be a film, a varnish, a laminate, or an environmentally-sensitive material. Coating 122 may act as an insulator, or may have dielectric, conductive, or magnetic properties that are constant or that can vary as a function of a sensed parameter, or that can vary in response to the presence or absence of a chemical or biological material. For example, coating 122 may be a polymer-based material having polar or dipole characteristics. As an exemplary and non-limiting list, coating 122 may have dielectric, conductive, insulating, or magnetic properties that vary in response to temperature, humidity, pressure, or other environmental factors; coating 122 may also have dielectric, conductive, insulating, or magnetic properties that vary in response to the concentration of particular compounds in the ambient environment.

Coating 122 may be disposed over a portion of antenna 104, as shown in FIG. 1a. In some exemplary embodiments, as shown in FIG. 1c. Coating 122 may be disposed over the entirety of antenna 104. Coating 122 may be applied to antenna 104 via methods such as printing, vacuum deposition, or any other method known in the art. Coating 122 may further be disposed within gap 116, as shown in FIG. 1b, so as to separate the edges of loops 114 from each other. The presence of coating 122 over antenna 104 and loops 114 and within gap 116 may interact with the performance of antenna 104, and, therefore, may alter the behavior of RFID tag 100. For example, the gain, far field performance and near field performance of RFID tag 100 may be altered by the presence and properties of environmentally-responsive material 120. Additionally, the interactions between coating 122 and antenna 104 may be stronger at turns 115, as coating 122 may be in closer contact with loops 114 in the gaps between the turns.

In operation, the dielectric, conductive, insulating, or magnetic properties of coating 122 may vary in response to a particular ambient environmental factor, as described above. Such a variation may in turn induce a variation in the interaction between loops 114 at the location of coating 122, and may likewise induce a variation in the interaction between coating 122 and antenna 104. Thus, operating properties of antenna 104 such as gain, near field performance and far field performance may vary in real time in response to the particular environmental factor. For example, an ambient environmental condition, climate condition or the presence of one or more substances, elements, compounds or chemicals can prompt a response from coating 122. This response may then cause a desired change or variation to any signal sent from RFID tag 100 when it is read or queried.

FIG. 2 shows another exemplary embodiment of an RFID device 200. RFID device 200 may include a substrate 202, an electrically conductive antenna 204 disposed thereon, and wireless communications device, such as an RFID chip 208 that may be part of an RFID strap or interposer 206. Strap or interposer 206 may further include conductive leads 210, 212 to facilitate coupling between antenna 204 and RFID chip 208. In some embodiments, strap or interposer 206 may also include a substrate to facilitate supporting RFID chip 208 and conductive leads 210, 212.

Antenna 204 may include at least one UHF (ultra high frequency) antenna portion 214, and a central region 215. Central region 215 may include at least one gap 216 defining at least one tuning loop portion 218, the tuning loop portion having any desired number of loops 220. Gap 216 may be formed by any desired process that is not likely to remove significant amounts of the material from which antenna 204 is formed. For example, gap 216 may be formed by rotary cutting, laser ablation, etching, other methods of mechanical or chemical material removal, or any other method known in the art.

RFID device 200 may further include a coating 222. In some embodiments, coating 222 responsive materials may be a film, a varnish, a laminate, or an environmentally-sensitive material. Coating 222 may be applied to antenna 204 via methods such as printing, vacuum deposition, or any other method known in the art. Coating 222 may act as an insulator, or may have dielectric, conductive, or magnetic properties that are constant or that can vary as a function of a sensed parameter, or that can vary in response to the presence or absence of a chemical or biological material. For example, coating 222 may be a polymer-based material having polar or dipole characteristics. As an exemplary and non-limiting list, coating 222 may have dielectric, conductive, insulating, or magnetic properties that vary in response to temperature, humidity, pressure, or other environmental factors; coating 222 may also have dielectric, conductive, insulating, or magnetic properties that vary in response to the concentration of particular compounds in the ambient environment.

Coating 222 may be disposed over an at least one tuning loop portion 218 of antenna 204, as shown in FIG. 2. Coating 222 may further be disposed within gap 216, so as to separate the edges of loops 220 from each other. The presence of coating 222 over tuning loop portion 218 and within gap 116 may interact with the performance of antenna 204, and, therefore, may alter the behavior of RFID tag 200, for example by altering a response to a query, substantially as described above. Thus, an RFID tag 200 with coating 222 may be used to monitor any desired ambient conditions at the location of RFID tag 200. Such monitoring may be useful to assist in determining the viability of any goods or products associated with RFID tag 200, assist in determining a "use by" or "sell by" date, provide information relevant to the condition of any goods or products associated with RFID tag 200 or to assist in providing a desired environment for any goods or products associated with RFID tag 200.

In a further embodiment, coatings 122/220 may be pattern printed, such as through the use of ink jet, flexographic, ion deposition or the like. The pattern may be printed in close proximity to the cut structure, such as the antenna pattern or may be provided in discrete areas to form patches or blocks of material. The coatings 122/220 may be applied in a single pass operation or in multiple passes and in different patterns. The coatings 122/220 may be applied one on top of the other to form a stack, only partially disposed on one another or adjacent one another.

In the foregoing embodiment, each of the materials may be sensitive to a particular environmental condition or provide a response to a specific trigger. One coating material can respond strongly to a first trigger such as an alcohol and the other to a second trigger such as water vapor. The locations of the coated material could be provided in patches and may be located at discrete areas from one another so that interference from one trigger does not arbitrarily cause an issue with the other patch in attempting to sense its trigger.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method of forming an RFID device, comprising:
depositing an electrically conductive material on a substrate such that the electrically conductive material defines an antenna structure;
defining a gap in the electrically conductive material and at least one tuning loop portion in the electrically conductive material, the tuning loop portion having a plurality of loops separated by the gap;
depositing a plurality of coatings in patches that are located at discrete areas from one another and only over one tuning loop portion of the antenna structure and within a portion of the gap to separate edges of the tuning loop portions from each other, and the coating is an environmentally-responsive material that acts as an insulator; and wherein one coating provides a response to a first trigger and another coating provides a response to a second trigger and magnetic properties of the coating varies in response to a presence or absence of a chemical or biological material; and
coupling a wireless communications device, such as a strap or interposer with a RFID chip and having conductive leads to facilitate coupling between the antenna structure and RFID chip.

2. The method of claim 1, wherein defining a gap in the electrically conductive material is performed by rotary cutting.

3. The method of claim 1, wherein defining a gap in the electrically conductive material is performed by laser ablation.

4. The method of claim 1, wherein the magnetic properties of the coating varies as a function of an environmental condition.

* * * * *